(12) United States Patent
Stradley (10) Patent No.: US 10,938,990 B2
(45) Date of Patent: Mar. 2, 2021

(54) ELECTRONIC TALKING STICK

(71) Applicant: Suzanne Stradley, Palm Desert, CA (US)

(72) Inventor: Suzanne Stradley, Palm Desert, CA (US)

( * ) Notice: Subject to any disclaimer, the term of this patent is extended or adjusted under 35 U.S.C. 154(b) by 0 days.

(21) Appl. No.: 16/036,450

(22) Filed: Jul. 16, 2018

(65) Prior Publication Data

US 2019/0364144 A1 Nov. 28, 2019

Related U.S. Application Data

(63) Continuation-in-part of application No. 15/987,173, filed on May 23, 2018.

(51) Int. Cl.
*H04M 3/56* (2006.01)
*H04M 1/725* (2006.01)
*G04F 3/00* (2006.01)
*H04N 7/15* (2006.01)

(52) U.S. Cl.
CPC .............. *H04M 3/567* (2013.01); *G04F 3/00* (2013.01); *H04M 1/72519* (2013.01); *H04N 7/15* (2013.01)

(58) Field of Classification Search
CPC .................. G04F 3/00; G04F 3/06; G04F 3/08
See application file for complete search history.

(56) References Cited

U.S. PATENT DOCUMENTS

| 3,845,614 | A | * | 11/1974 | Christ | G04B 25/005 368/253 |
| 4,451,158 | A | * | 5/1984 | Selwyn | G04G 13/00 368/107 |
| 4,995,018 | A | * | 2/1991 | Edwards | G04F 1/005 368/107 |
| 5,905,694 | A | * | 5/1999 | Rothberg | G04F 8/08 368/107 |
| 5,978,939 | A | * | 11/1999 | Mizoguchi | G06F 11/0757 713/502 |
| 6,326,883 | B1 | * | 12/2001 | Whitehead | G04F 1/005 340/309.3 |
| 7,124,164 | B1 | * | 10/2006 | Chemtob | G06Q 10/10 709/204 |
| 10,026,275 | B1 | * | 7/2018 | Riley | G08B 5/36 |
| 2002/0141383 | A1 | * | 10/2002 | Schaefer | H04L 29/06 370/352 |
| 2009/0307610 | A1 | * | 12/2009 | Ryan | G06Q 10/00 715/756 |
| 2010/0085416 | A1 | * | 4/2010 | Hegde | H04N 7/147 348/14.08 |

(Continued)

*Primary Examiner* — Daniel P Wicklund
(74) *Attorney, Agent, or Firm* — Donald R. Boys; Central Coast Patent Agency LLC (57) ABSTRACT

Audio telephone and video conferencing systems have a computerized server having a plurality of ports for terminating audio and video from participants, a connection to an Internet network, software providing switching and controls in conference management, and an interactive interface enabling an organizer to configure a conference, selecting time and participants, and a timer function timing participation by individual ones of participants. As each participant is enabled to speak, a preprogrammed time-to-speak is announced or displayed to at least the instant speaker, and the timer function begins to count down from the time-to-speak.

8 Claims, 8 Drawing Sheets

(56) References Cited

U.S. PATENT DOCUMENTS

| | | | |
|---|---|---|---|
| 2011/0022968 A1* | 1/2011 | Conner | G06Q 10/10 |
| | | | 715/753 |
| 2012/0226997 A1* | 9/2012 | Pang | H04L 65/4038 |
| | | | 715/753 |
| 2014/0068463 A1* | 3/2014 | Kay | H04L 65/403 |
| | | | 715/753 |
| 2015/0378314 A1* | 12/2015 | Nakabayashi | G04F 1/005 |
| | | | 368/108 |
| 2019/0073998 A1* | 3/2019 | Leblang | G10L 15/065 |

* cited by examiner

ELECTRONIC TALKING STICK

CROSS-REFERENCE TO RELATED DOCUMENTS

The present invention is a Continuation-in-Part of U.S. patent application Ser. No. 15/987,173, filed on May 23, 2018 and entitled "Electronic Talking Stick". Disclosure of the parent application is incorporated herein at least by reference.

BACKGROUND OF THE INVENTION

1. Field of the Invention

The instant invention is in the technical are of hand-held electronic devices, and in one embodiment comprises circuitry of a microphone

2. Description of Related Art

In native-American history there is known use of a decorated object, in some instances a branch or stick, that is passed between participants of a conference or discussion, which is used to pass along permission to talk, and the object is called a talking stick. The person to whom the talking stick is passed has the floor, so to speak, until the talking stick is passed to another. Use of a talking stick has progressed to the present day and is an effective means to control interaction among a group of people who wish to express opinions.

One problem with the conventional, historic talking stick stems from the very familiar circumstance that, in any discussion, there always seems to be one person, at least, that tends to dominate the discussion. Since the permission to speak doesn't pass until the stick passes, this can be a problem.

The problem mentioned above regarding tendency of one person to dominate a discussion is not limited to meetings in which people interact in person, but also occurs in telephone conferences and video conferences of all sorts; anywhere that a select group of people interact verbally on any subject.

What is clearly needed is an electronic talking stick that may be used to manage interaction among participants in a discussion, that has considerable additional functionality. The functionality of such an electronic talking stick also needs to be extended virtually to telephone and video conferences.

BRIEF SUMMARY OF THE INVENTION

In an embodiment of the invention an audio telephone conference system is provided, comprising a computerized server having a plurality of ports for terminating telephone calls, a connection to an Internet network, software providing switching and controls in conference management, and an interactive interface enabling an organizer to configure a conference, selecting time and participants, and a timer function timing participation by individual ones of participants. As each participant is enabled to speak, a preprogrammed time-to-speak is announced to at least the instant speaker, and the timer function begins to count down from the time-to-speak.

In one embodiment, at a preselected alert point in time, an announcement is made to at least the instant speaker providing an indication of time left to speak. Also, in one embodiment the indication of time left to speak is an announcement of the actual minutes or seconds left to speak.

In one embodiment the announcement of time left to speak is made to all participants. And in one embodiment, in addition to the announcement of time left to speak, a second announcement is made to at least the instant speaker, when time-to-speak has expired, that the time-to-speak has expired.

In one embodiment the announcement that time to speak has expired is made to all participants. Also, in one embodiment, after the announcement is made that time has expired, the system switches audio to a next speaker. In one embodiment after the announcement is made that time has expired, the system does not switch audio to another speaker, but allows the instant speaker an extra period of time to speak before switching audio to a new speaker. In one embodiment all audio during a conference is recorded and associated with the contributing speakers. And in one embodiment audio at the end of a conference is made available to participants as audio recordings, and as text.

In another aspect of the invention a video conferencing system is provided, comprising a computerized server having a plurality of ports for receiving video, including audio, from a plurality of participants, a connection to an Internet network, software providing switching and controls in conference management for selecting what video input to transmit to which participants, and an interactive interface enabling an organizer to configure a conference, selecting time and participants, and a timer function timing participation by individual ones of participants. As each participant is enabled to speak, a preprogrammed time-to-speak is announced to at least the instant speaker, the timer function begins to count down from the time-to-speak.

In one embodiment the indication of time to speak is a text indication displayed on a display screen of a video platform used by the speaker and connected through a network to the computerized server. In one embodiment at a preselected point in time, an alert is made to at least the instant speaker providing an indication of time left to speak. In one embodiment the alert comprises a change in color from green to yellow in an icon displayed on the display screen of a video platform used by the speaker. And in one embodiment the alert of time left to speak is made to all participants.

In one embodiment, in addition to the alert of time left to speak, a second alert is made to at least the instant speaker, when time-to-speak has expired, that the time-to-speak has expired. In one embodiment the second alert comprises a change in color from yellow to red in the icon displayed on the display screen of the video platform used by the speaker. In one embodiment the alert that time to speak has expired is made to all participants. In one embodiment, after the alert is made that time has expired, the system switches video to a next speaker. In one embodiment, after the alert is made that time has expired, the system does not switch audio to another speaker, but allows the instant speaker an extra period of time to speak before switching video to a next speaker. In one embodiment all video during a conference is recorded and associated with the contributing speakers. And in one embodiment video at the end of a conference is made available to participants as video recordings, and audio is made available both as audio and as text.

DETAILED DESCRIPTION OF THE INVENTION

Figure 1:
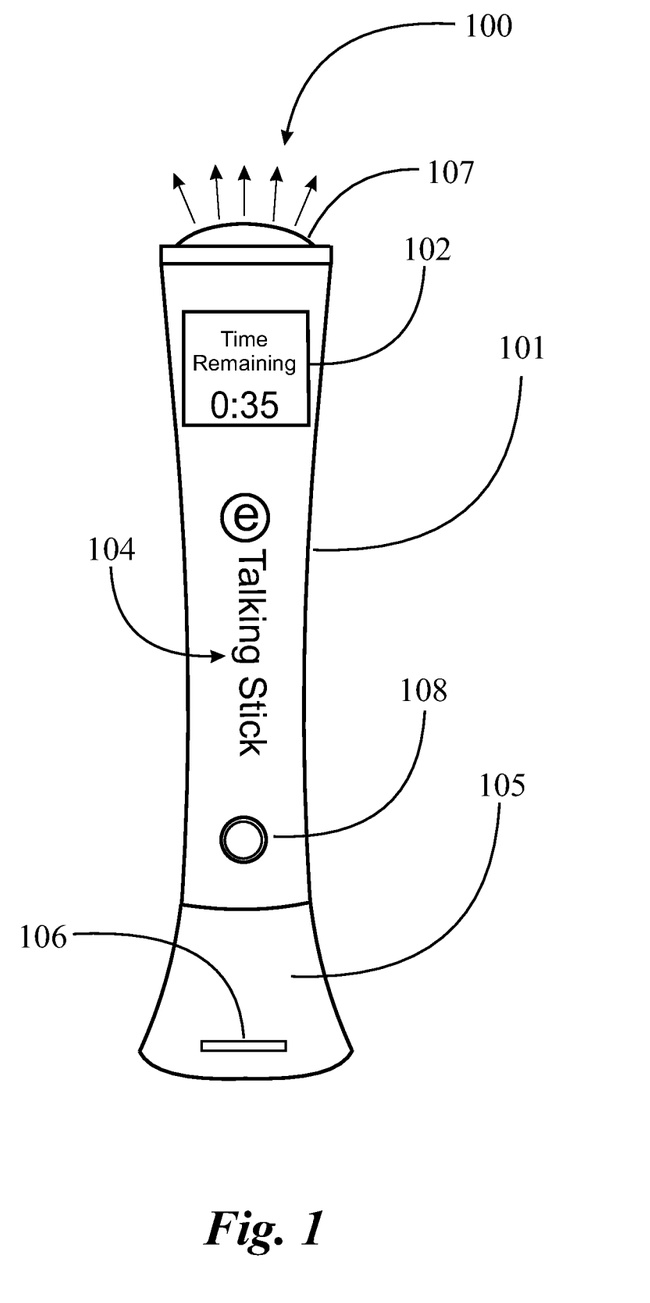
FIG. 1 is an elevation view of an electronic talking stick in one embodiment of the present invention.

FIG. 1 is an elevation view of an electronic talking stick 100 in an embodiment of the present invention. Electronic talking stick 100 in this example is a hand-held device having a housing 101 with an elongated shape that has a circular cross-section, although the circular cross section is not a limiting concept in the invention. The circular shape is convenient to make the electronic talking stick comfortable to hold in one hand.

In this example electronic talking stick 100 has a timer implemented inside housing 101, the timer communicating with a small display 102, that in one instance displays time remaining to speak for a person holding the electronic talking stick. Display 102 may be LCD, LED or any other technology that is appropriate.

The electronic talking stick has a base portion in this example with a planar underside, so the electronic talking stick may be set on a table surface. There is an on/off button 108, which may, in some embodiments be a slider switch or rotary switch, and, in some embodiments, an optional USB port 106, although some embodiments do not employ USB. In addition, there is, in this example, a lighting system 107 that in some embodiments may emit green, yellow and red light. There may or may not be a logo 104 on the electronic talking stick.

Figure 2:
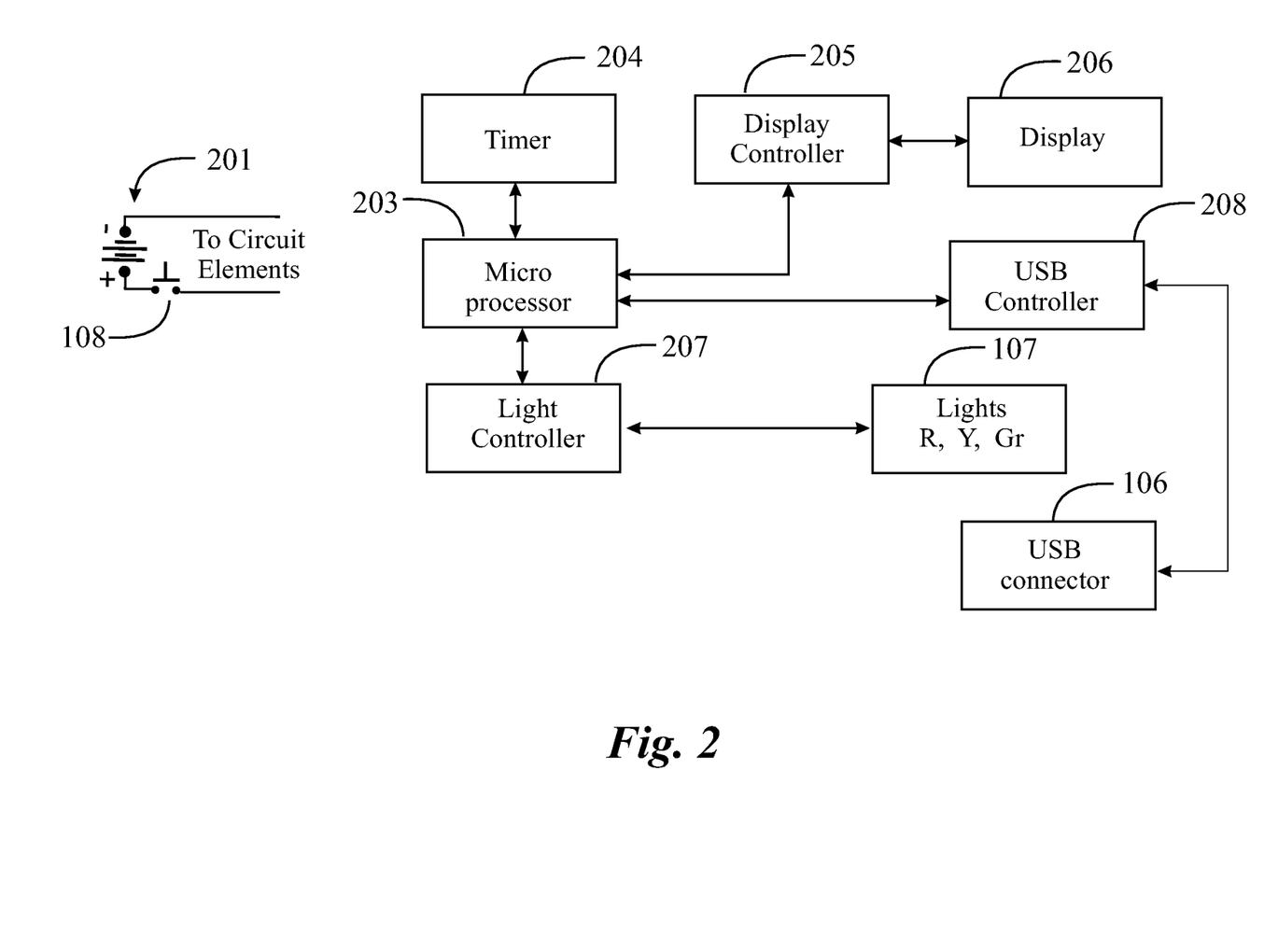
FIG. 2 is a simplified diagram of electronic circuitry for the electronic talking stick of FIG. 1.

FIG. 2 is a somewhat simplified exemplary circuit diagram for electronic talking stick 100 of FIG. 1. The electronic talking stick in the embodiment of FIG. 1 is powered by a battery 201, which supplies power to electronic elements through on/off switch 108. Switch 108 is shown in this example as a push-button switch, and in this embodiment requires functionality, but familiar to those with skill in the art, to render the switch activity as a toggle, such that pressing once may turn power on to the electronic elements, and a second press turns power off. In alternative embodiments the on/off switch may take other forms, such as a toggle or a rotary switch.

Battery 201 may be a rechargeable battery, which may be recharged by a DC input at a port not shown, but well-known in the art, and in some circumstances may also be charged through the USB port and circuitry. In some implementation power may be by replaceable batteries, such as AA batteries, in which case there is a battery bay and closure to facilitate battery replacement.

In this example order of functions is controlled by a microprocessor 203, which is programmed for the functionality. In other embodiments the control may be through a programmable chip or firmware device. In one embodiment there is a USB connector 106 through a USB controller 208, to the microprocessor, through which, connected to a computerized device, executing a compatible application, programming of the microprocessor may be established and amended, including settings for thresholds. A USB controller is shown connected to microprocessor 203 and to USB connector 106.

In one embodiment, when power is applied by switch 108, microprocessor 203 resets a timer 204, which begins to count down from a preprogrammed time period, which is synonymous with an agreed-to time to talk in a meeting or conference. This time to talk may be hard-programmed, or in some embodiments may be adjustable for a particular meeting or purpose. At the same initiated time microprocessor 203 controls a light controller 207 to emit green light for light 107 in FIG. 1.

One may assume that when on/off switch 108 is activated, providing power to the microprocessor and other electronic elements, that the electronic talking stick may have been passed to a new participant in a meeting or conference, and that receiving participant has activated the electronic talking stick. According to known rules the receiving person may now start talking and hold the floor for the agreed-to time period. Also, when power is applied, microprocessor 203 signals a display controller 205 which controls display 102 of FIG. 1. In one circumstance the display may immediately render the agreed-to time period for each participant to talk, and then count down in seconds.

For exemplary purpose, assume that the agreed-to time to talk is five minutes. In this example timer 204, once activated, counts down in seconds from five minutes, and light 107 is green, indicating that the speaker is well within the agreed-to time to talk. Display 102 indicates time remaining, counting down.

There may be a pre-set time to indicate to the speaker, and to others in a meeting, that the speaker is near the end of the time to talk, in this case five minutes. At 30 seconds remaining, microprocessor 203 may signal light controller 207 to change the light from green to yellow. In another embodiment, the green light goes off at one minute before the end of the time period, and the yellow light comes on with 30 seconds to the end. The yellow light indicates to the speaker, and other participants, that time is close to expiration. The yellow light remains in effect until time expires, at which time microprocessor 203 signals light controller 207 to turn light 107 to red. The red light indicates to the speaker and other participants that the time to speak for the current speaker has expired.

When the red light comes on, agreed-to behavior is that the current speaker yields to a next speaker. The current speaker may activate switch 202, which operates as a toggle, to turn power off to the electronic elements, at which time the timer resets and light 107 is extinguished. Display controller 205 may also turn off display 102.

At the end of time to speak for one speaker, the electronic talking stick is to be passed to a next speaker. The next speaker, if the next earlier speaker turned off the electronic talking stick, may activate switch 108 to restart the timing, display, and lighting process. If the previous speaker did not turn off the electronic talking stick, the next speaker may do so, and then reactivate to begin speaking.

In this simple embodiment the electronic talking stick performs the functions of an historic talking stick, with additional functionality of displaying time to talk, and a light or other alert functionality with go, caution and stop indication, with additional functionality to reset and reply the process for each new speaker.

As described, the purpose of the lights 107, or other alerts, is to notify the speaker and to other participants. In alternative embodiments alerts may be audible alerts rather than lights, or in addition to lights. For example, in one embodiment, at the 30-second mark before time expires, the electronic talking stick may emit an audible tone, or even a verbal phrase. Vibration may be used as well. Alerts then may be any combination of lights, audible signals, or vibration.

Figure 3:
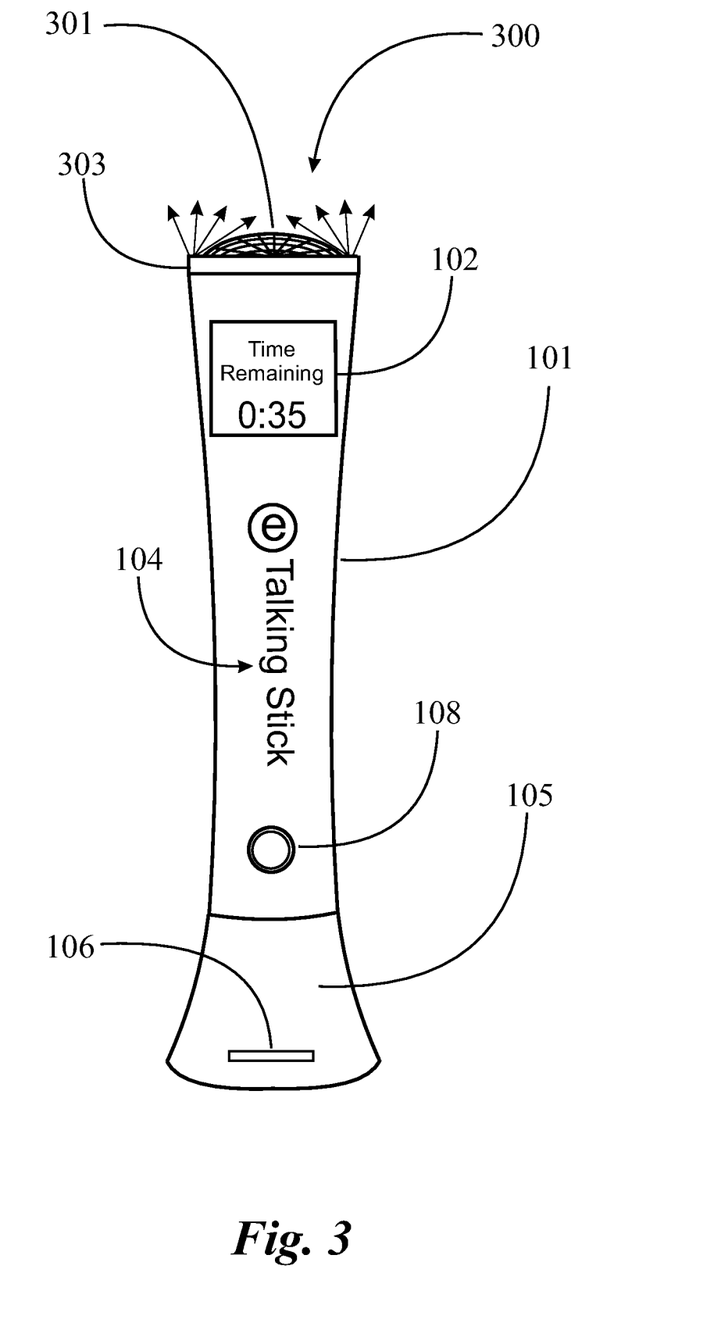
FIG. 3 is an elevation view of an electronic talking stick in an alternative embodiment of the invention.

FIG. 3 is an elevation view of an electronic talking stick in an alternative embodiment of the invention. In talking stick 300 of FIG. 3, many of the elements and functions described above with reference to FIGS. 1 and 2 may be repeated, and elements may bear the same element numbers as in the device of FIG. 1.

A significant difference between the electronic talking stick 100 of FIG. 1, and the electronic talking stick 300 of FIG. 3, is inclusion of a microphone having an audio input interface 301. Electronic talking stick 300 has all of the elements and functionality described above for electronic talking stick 100, plus functionality of a microphone for receiving audio speech of a person holding or using the electronic talking stick and transmitting that speech to an internal or external amplification and speaker system. In this instance, the speaker interface may be in the position of the lights in FIG. 1, but in FIG. 3 the lights may be from a light ring 303 surrounding the microphone interface.

Figure 4:
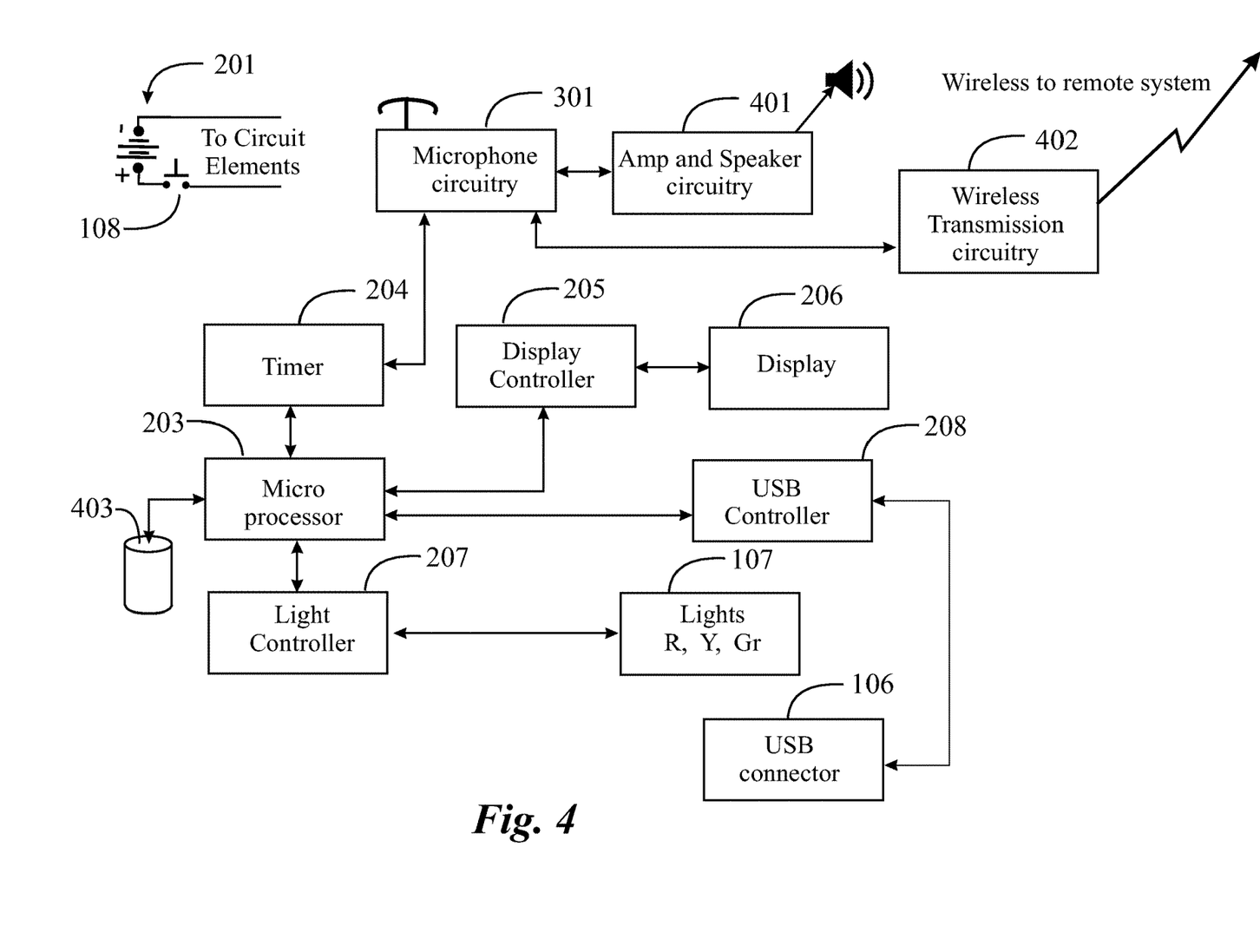
FIG. 4 is a diagram similar to that of FIG. 2, showing the elements of FIG. 2 and additional elements in an embodiment of the invention.

FIG. 4 is a block diagram similar to that of FIG. 2, showing the elements of FIG. 2, microphone and circuitry 301, and an internal amplifier and speaker 401. A near-field wireless communication circuitry 402 is shown as well, which may in some instances be Bluetooth™, which is functional to transmit audio data from microphone 301 to a system, not shown, external to the electronic talking stick. It should be understood that both the internal speaker and the external functionality may be present in the same implementation, but not necessarily so. One or the other may be present.

FIG. 4 also illustrates a data repository 403 coupled to microprocessor 203. In some embodiments repository 403 may store code to execute and data for functionality of the electronic talking stick. Such code a data may be amendable by a user through the USB system. In other embodiments speech may be recorded into repository 403 and speech data may be retrievable through USB port 106. The data repository in some embodiments may also store recorded messages that may be played through speaker circuitry 401, or even through external systems via transmission circuitry 402.

In some other aspects of the invention significant additional functionality is provided through external systems that may be reached through wireless transmission circuitry 402. One example is ability to pair with an external Bluetooth™ speaker system, so that a person using the electronic talking stick may have his/her speech provided through the external speaker, for benefit of all participants in a meeting or conference.

Figure 5:
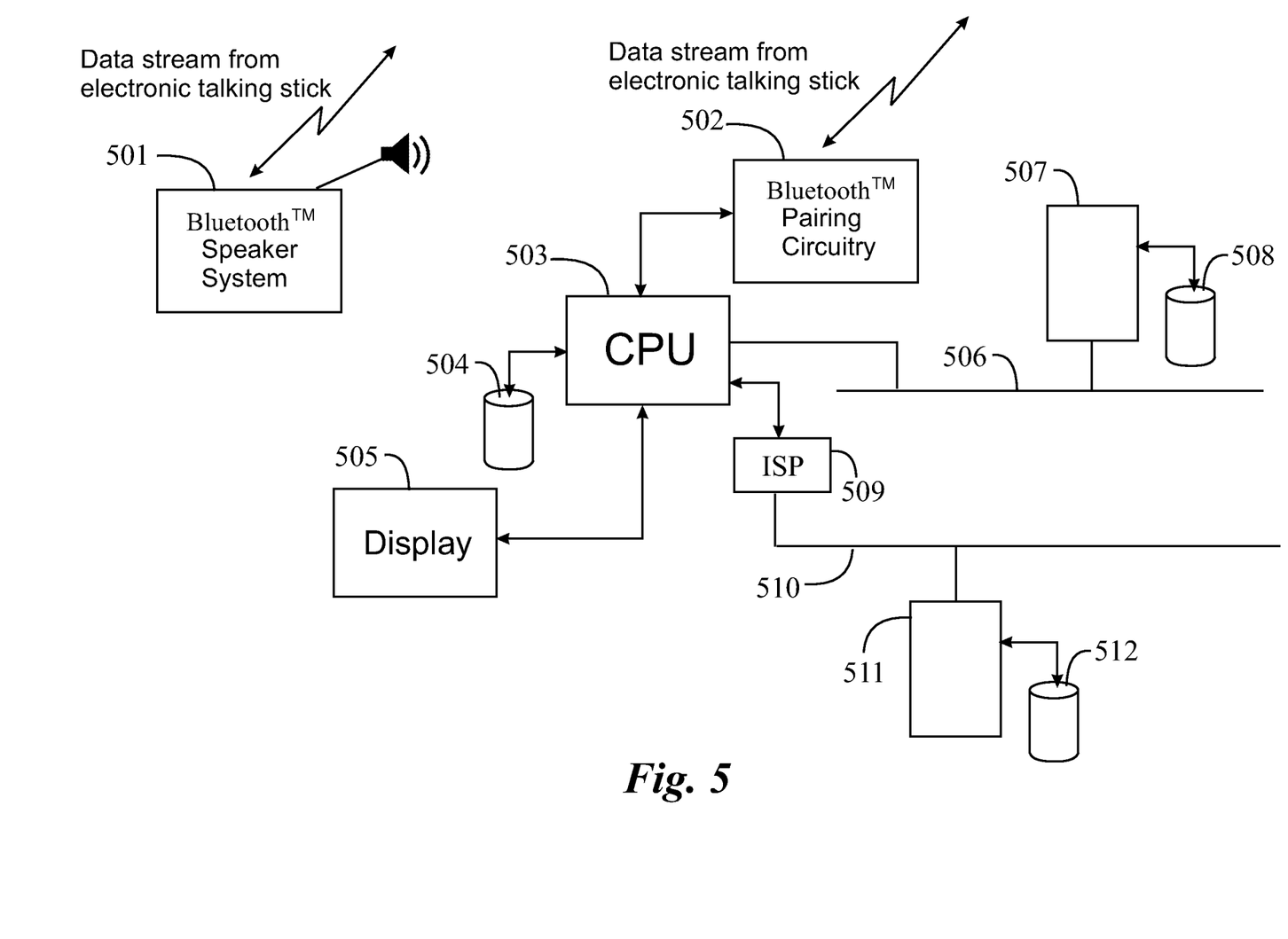
FIG. 5 is a block diagram illustrating optional elements in systems external to the electronic talking stick, that may be employed for additional functionality in an embodiment of the invention.

FIG. 5 is a block diagram illustrating optional elements in systems external to the electronic talking stick, that may be employed for additional functionality in concert with use of the electronic talking stick. As one example, Bluetooth™ speaker system 501 may pair with the electronic talking stick, and broadcast speech rom a user of the electronic talking stick. System 501 may be, in some implementation a single speaker in a location that audio is close to the speaker and other participants in a conference or may be a more sophisticated system comprising several speakers in an upscale sound system.

In another implementation a computerized system controlled by a CPU 503 may receive signals through Bluetooth™ pairing circuitry 502 and store audio files in data repository 504. In one implementation, as each participant speaks, audio is recorded, and an audio file is implemented and saved as a separate file each time a user turns the electronic talking stick off to pass to another speaker. This action, as described above, may be a simple reset of the circuitry of the electronic talking stick.

In another embodiment, as a user is speaking into the electronic talking stick, CPU 503 may be functional to perform voice-to-text on the audio input and display the text in near real time on a display 505, which may be visible to the speaker and to other participants. Transcribed speech may also be saved in repository 504 and associated with saved audio for each speaker that used the electronic talking stick. CPU 503 may be, in some embodiments, part of a general-purpose computer system operated by an organization or enterprise with which speakers in a conference are associated, and there may be regular management and reports generated using the saved audio and text, which may be associated with meeting time and day, and purpose for the organization or enterprise.

In other embodiments of the invention CPU 503 may be coupled to a Local area Network (LAN) 506 in an enterprise, and there may be servers represented by server 507 coupled to the LAN, and to data repositories represented by 508. In a dedicated system in an enterprise, like a division of a corporation, employees may have profiles stored in data repositories 508 coupled to servers 507. CPU 503 may be coupled as well, through an Internet Service Provider that may be any one of several devices and protocols, to a wide area network (WAN) like the well-known Internet network, where a great many sites may be connected.

Figure 6:
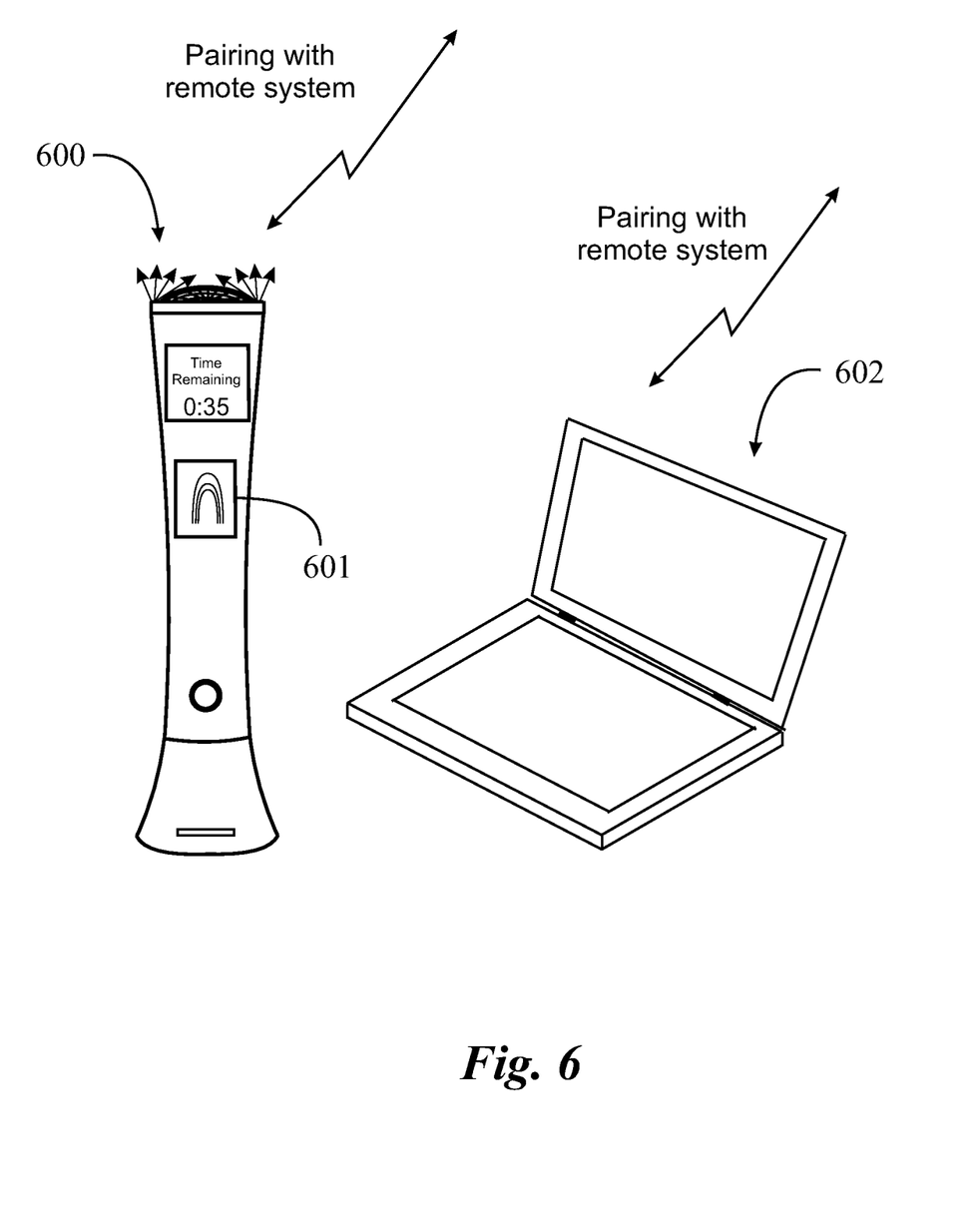
FIG. 6 illustrates an electronic talking stick paired to an external system as illustrated in FIG. 5, and a pad device in an embodiment of the invention.

FIG. 6 illustrates an electronic talking stick 600 paired to an external system as illustrated in FIG. 5, and a pad device 601 also paired with the same external system, external simply meaning outside the circuitry of the electronic talking stick. Electronic talking stick 600 has a biometric input 601, in this example a fingerprint pad, with which a speaker may identify herself to the computerized external system, accessing, for example, data of various sorts that may be stored in that user's profile in, for example data repository 508 coupled to server 507 on LAN 506. It was described above, that in an enterprise setting, employees may have stored profiles with identity, job description, pictures, and data of many sorts. The speaker through such data access may use another device, such as pad device 602, to access and utilize stored data on that user's profile. The speaker may, for example, through an app executing on device 602, cause music or other sound effects to play over the external speaker system in concert with her own speech in real time in a conference. Explosions, drum rolls, music clips and more may be used. The speaker may also display image files on display 505 in concert with speech in real time. All may be recorded as a session for that speaker.

In other embodiments a smart phone or laptop, or other smart device may be used with wireless connectivity to external systems. It should also be noted that biometric input may be voice recognition or another form of bio input, other than fingerprint. Returning to FIG. 5, it may be noted that employees in an enterprise may have computerized platforms connected to or connectable to LAN 506, and these employees may, in some embodiments, access meeting data stored, for example, in repository 504 during or after a meeting. It may be propitious, for example, for a participant in a conference enhanced by use of an electronic talking stick, to access and review what a previous speaker has said, before that participant has the electronic talking stick and permission to speak. An upcoming speaker might well do so through a smart device paired to the external system, during the time of a conference.

In another aspect of the invention, functionality provided by an electronic talking stick, as described in several examples above, is extended to circumstances of groups of people engaged in telephone and video conferences. Such conferences are very well-known in the art, where two or more people are connected through telephone equipment, or through computer systems, to engage in a discussion. As one example, there exist in the art conference systems enabling persons to dial in using any sort of telephonic device, which may be a land-line phone, a cell phone, or a computer VoIP system, like Skype™, for example, and participants who have dialed in then may engage in an audio conference. There are a variety of control schemes in the art by which such conferences may be governed, but, to the inventor's knowledge, none of these impose controls of the sort described above for the electronic talking stick.

Figure 7:
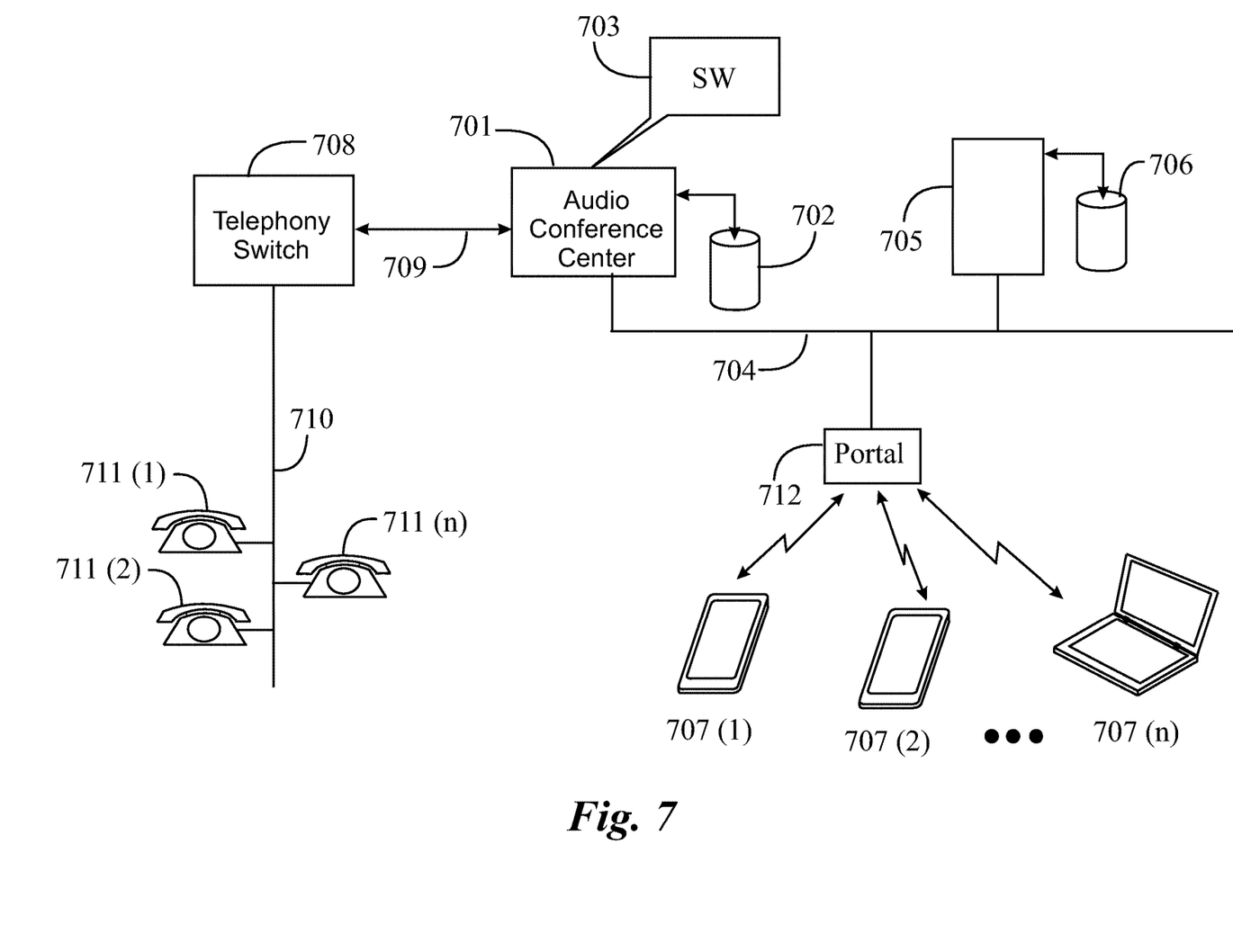
FIG. 7 is an exemplary diagram depicting talking stick functionality in a telephone conference.

FIG. 7 is an exemplary diagram depicting talking stick functionality in an audio telephone conference situation. An audio conference center 701 is a computerized server enabled through software 703 executing on a processor of the server to terminate a plurality of telephone connections and to join groups of connections into conferences. Conference center 701 in this example is connected to a data repository 702 which may store telephone numbers and addresses for individuals engaged or having been engaged in conferences managed by conference center 701.

A telephony switch 708 connected to at least one land-line trunk 710 enables calls initiated from land-line telephones 711(1) through 711(*n*) to connect through a trunk 709 to conference center 701. In addition to the land-line functionality, conference center 701 is also connected to a packet network represented by backbone 704, representing all of the subnetworks and connectivity of, for example, the well-known Internet network.

Server 705 with data repository 706, shown connected to the packet network 704 represents one of many third-party enterprises and services that may be connected on the packet network, and that may also interact with conference center 701.

A general portal 712 is shown connected to packet network 704, and devices 707(1-*n*) are illustrated as connected through portal 712, enabling users of these devices, through telephony software, to also call in to conference center 701 by voice-over-IP (VoIP) technology, and to be included in conferences managed by conference center 701 by execution of SW 703.

Conference center 701, managed by SW 703, in this example is limited to audio conferences. Many management schemes are known in the art. For example, in one circumstance a conference organizer may configure a conference for a certain future day and time and may select participants for the conference. Telephone numbers or IP addresses may be entered for the participants, or names may be entered or selected from a list of conferees stored in data repository 702. Selected participants may be alerted that they are participants by voice mail, email, or by other communication channel, and at the time of the conference the notified participants may call in and be entered into the conference.

In some circumstances the conference center may, at the time of the conference, call individual ones or all of the participants.

Once a conference is initiated and in progress there are a variety of control schemes known in the art. There may, for example, be a conference leader during the conference, which may be the originator of the conference, or another participant, who may be enabled to exert a level of control into issues of who is speaking, who will speak next, how long one may speak, and in some cases that leader may be able to exercise control of muting or completely cutting off a participant.

In embodiments of the present invention conferences may be organized and joined in much the same way as described above, and in other ways known in the art. Control in embodiments of the invention pertain primarily after a conference begins, and during the conduct of the conference. Particular control is exercised to impose the functionality described above for embodiments using an electronic talking stick in discussions.

In audio conferences enabled through conference center 701 the participants are, of course, remote from the conference center, and remote from one another. There is no physical ability to pass an electronic talking stick from one participant to another. The order of speaking, duration imposed, and alerts as to approaching limits, as described above, however, may be imposed on the conferees by SW 703, just as with an electronic talking stick.

In one embodiment, once participants are known, an order of speaking may be imposed. This order may be arbitrary and set by the conference organizer before the conference or may be imposed in real time by the conference leader, either as an order that may be amended during the conference or may be imposed at the end of each dialogue by a participant to pass the talking stick, so to speak, to a next participant.

A duration of time-to-speak is preset in embodiments of the invention, and a timer begins timing down as each participant starts his or her turn at speaking. In one embodiment, as a participant is recognized to speak, a recorded utterance may be played for that participant. For example, the agreed-to and programmed time-to-talk for each participant may be five minutes, and the announcement to a participant at the beginning of that participant's dialogue may say "Five minutes". Five minutes, or course, is an example, and the time-to-talk may be more or less time.

In some embodiments the announcement at the beginning may be restricted to just the participant enabled to talk. In other embodiments all participants, or a select group, may also here the announcement.

Once the participant begins speaking, the timer keeps decrementing, and a warning may be set to be announced as the speaker approaches the maximum time to speak, just as described above for the electronic talking stick. The example used above is 30 seconds prior to the maximum time to talk, and that same period suffices in this description. At a time of four minutes and 30 seconds after the present speaker begins, an announcement may be made as an alert, for example "thirty seconds". The speaker then knows he or she has thirty seconds left to speak. A single announcement at thirty seconds to go is, of course, exemplary. There could be a series of announcement as time winds down, at different times.

At the end of the time-to talk, there may be different functionality imposed in different embodiments of the invention. IN one embodiment the speaker's ability to be heard by other participants may simply be turned off. The speaker, of course, may continue to speak, but the system may simply pass the talking stick to a next speaker, and start the timer, and make the time announcement to the next speaker. The former speaker may quickly realize that he or she is not being heard in the conference.

The functionality thus far described seems to assume that one speaker will speak for the time-to-speak, before any other participant may be heard. This is not a limitation in embodiments of the invention. It is well-known that in the conference all of the participants will hear the speaker, and in many cases the speaker, who has been afforded a time to speak, is really afforded a time to lead the conversation. The instant speaker in some embodiments, may ask questions or ask for input from other participants, and listen to answers or the other input during his or her timed engagement. But is still terminated at the end of the time-to-speak.

In some embodiments a speaker may be permitted extra time, which may be a pre-programmed feature. The speaker in such a circumstance may be allowed an extra minute or two after expiration of the time-to-speak and will not be cut off immediately. In some embodiments that speaker may be marked by the system as having used, for example, 90 seconds more than the allotted time, and in circumstances wherein the speaking order may be repeated, which may be a typical arrangement in embodiments of the invention, the speaker going over time may be docked the second time around for the extra time used the first time around.

In some embodiments of the invention a speaker may yield his or her time to speak to another participant, and in some embodiments a speaker may request yield time from other speakers, in which case a time-to-speak may be adjusted for different speakers. For example, in one conference several participants may yield one half of their time to another participant, who may accrue extra time thereby, and the yielding speakers time will be docked accordingly. There are many possibilities. A principal and important feature in embodiments of the invention is the imposition of a timer, and announcements, at least to the instant speaker, of time left to speak.

Figure 8:
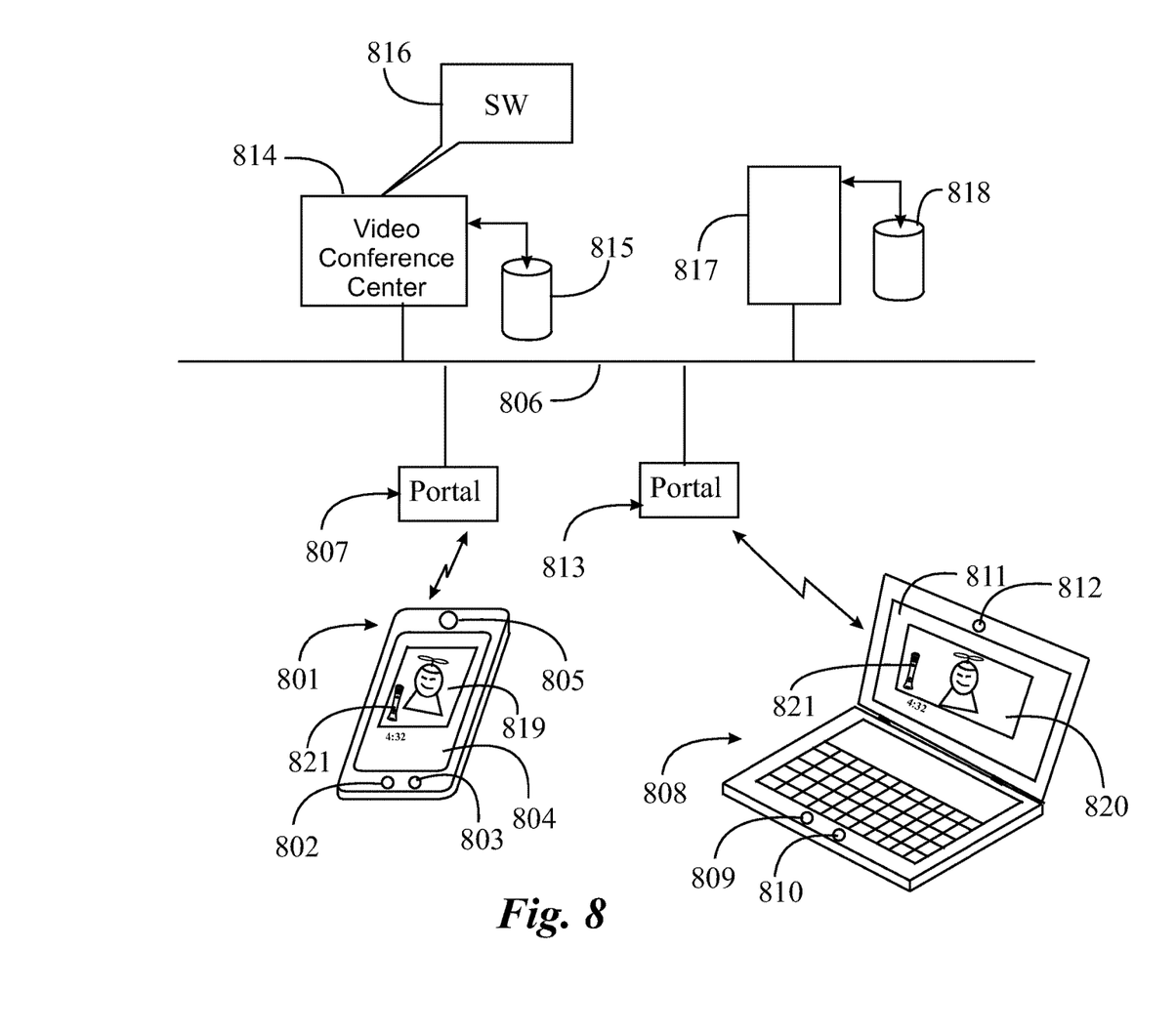
FIG. 8 is an exemplary diagram depicting talking stick functionality in a video conference.

In one embodiment of the invention talking stick functionality is made available as software plug-ins for existing audio conference systems Talking-stick functionality is applicable as well to video conferences, which are well-known in the art, such as provided through third-party vendors like Skype™ and ZOOM™, for example. In video conferences participants have use of computerized platforms that have both an imaging device (a camera) and a screen for displaying images of other participants during participation. FIG. 8 is a diagram illustrating two participants in a video conference using platforms 801 and 808. In this example platform 801 is a cellular telephone having a microphone 802, a speaker 803, a display screen 804 and a camera 805. Platform 801 connects to Internet backbone 806 through a suitable portal 807, which may, in this instance be a portal in a cellular network.

Platform 808 in this example is a laptop computer having a microphone 809, a speaker 810, a display screen 811 and a camera 812. Platform 808 connects to Internet backbone 806 through a suitable portal 813, which may, in this instance be a WiFi portal.

Video conference center 814 supported on the Internet is a computerized server executing software 816 and connected to a data repository 815. A third-party server 817 with a data repository 818 represents a plurality of such servers known to be connected in the Internet network, capable of providing services.

Both platforms 801 and 808 have I/O ports not shown whereby a user may connect a headset with a mic input, which the user may use in conferencing rather than the external mic and speaker shown in FIG. 8.

Platforms 801 and 808 in FIG. 8 are meant to represent a plurality of platforms used by a plurality of participants in a video conference. There may be many more platforms and participants than the two shown. In an embodiment of the invention a video conference may be configured by an organizer, not shown, just as described above for an audio conference. This may be done in either the audio conference or the video conference instance through a web site provided by SW 703, in the case of audio conferences, or by SW 816 in the case of video conferences.

Once a video conference commences, as is typical of such conferences, a window is displayed on the screens of each of the participants in the conference, and the window typically displays prominently the current speaker. Other participants may be represented by thumbnail icons in a portion of the display screen. A window 819 is shown on the screen of device 801, and a window 820 is shown on the screen of device 808, each with an indication of an image of a speaker.

In many respects operation of a video conference by conference center 814 of FIG. 8 is very similar to operation of an audio conference by conference center 701 of FIG. 7. An organizer may set up a conference and, in some cases, determine an order of speakers. A topic may be displayed when a conference begins, and in embodiments of the invention a timer is imposed, speakers are timed, and alerts are provided.

In the case of a video conference the indication of timing and alerts may be visual rather than only audio. In one embodiment an image 821 of the electronic talking stick is displayed on screen 804 or 811 and may be displayed along with the image of the speaker in windows 819 and 820. As a designated speaker takes over, the time-to-speak is displayed, but instead of being displayed in a very tiny window in the image of the talking stick, where participants would likely be unable to read the time, and follow the changes, the time may be displayed on the screen in a font large enough to by readily seen and followed, as shown below the image windows 819 and 820. In some embodiments the time-to-speak at the start may be announced in the video conference, just as was described for the audio conference. In some embodiments, as a speaker starts, the talking stick image may display green at the upper end, just as in the physical cases described above, and the color may change to yellow at a warning time close to expiration of the time-to-speak. This time, in one example, is 30 seconds before expiration. At expiration the color may change to red.

In other embodiments other indicia may be used for alerts and warnings, such as, for example, a declining graph may be displayed on the screen, with a solid time line that gets shorter as time winds down, and the graph line may change color at certain time points to indicate approach of expiration, and expiration.

In audio and video conferences, as well as meetings of persons using a physical talking stick, all speakers may be recorded, audio for audio conferences, and video, such as MP4, for video conferences. Utterances by speakers in a video conference may be rendered as text (transcribed) and saved as well, and audio may be displayed as text in real time, similar to captioning in multi-media presentations. Audio recordings, associated with speakers, both as audio and text may be made available to individual participants or to all participants after a conference is completed. In summary, all of the control functionality of the electronic talking stick may be imposed in telephone conferences and video conferences.

Given the descriptions above of the various embodiments, and the systems and technology involved, a person of skill in the art will be aware that there are many more use cases and applications that may be described within the scope of the invention. Further, each elements and function as described above may be combined with others to provide new embodiments of the invention. The scope of the invention is limited only be the claims below.

The invention claimed is:

1. A video conferencing system, comprising:
a computerized server having a plurality of ports for receiving video, including audio, from a plurality of participants, a connection to an Internet network, software providing switching and controls in conference management for selecting what video input to transmit to which participants, and an interactive interface enabling a moderator to configure a conference, selecting time and participants;
computerized appliances used by individual participant's, the appliances having monitors displaying video switched to participants by the software; and
a timer function timing participation by individual ones of participants;
wherein, as each participant is enabled to speak, an icon is displayed on the speaker's monitor, the icon depicting an object having a body with a light ring at an upper end around the body, the timer function begins to count down from a pre-programmed time-to-speak, as the time to speak winds down, at a first warning time prior to the timer timing out the light ring on the icon shows green, at a second warning time in the time to speak the light ring on the icon shows yellow, and when time expires the light ring on the icon turns red.

2. The video conferencing system of claim 1 further comprising a text indication of time to speak displayed to the speaker separate from the icon.

3. The video conferencing system of claim 1 wherein at the time the light ring turns green a first audio tone is played to the speaker, at the time the light ring turns yellow a second audio tone is played to the speaker, and at the time the light ring turns red a third audio tone is played to the speaker.

4. The video conferencing system of claim 1 wherein the icon with the light ring and the changes in color are displayed to all participants.

5. The video conferencing system of claim 1 wherein, after time has expired, after a preprogrammed time lapse, the system automatically switches video and audio to a next speaker.

6. The video conferencing system of claim 1 wherein, after time has expired, the moderator switched video and audio to a next speaker.

7. The video conferencing system of claim 1 wherein the body of the icon is in the shape of a talking stick having a smooth, opaque body with an elongated shape from a lower end to an upper end that has a circular cross-section that diminishes in diameter from a larger lower end to a minimum diameter between the lower end and the upper end, and then expands to a larger diameter from the minimum diameter to the upper end.

8. The video conferencing system of claim 1 wherein the first and the second warning times are adjustable by the moderator.

* * * * *